United States Patent
Chen et al.

(10) Patent No.: US 10,959,143 B2
(45) Date of Patent: Mar. 23, 2021

(54) COMMUNICATION CONNECTION CONTROL METHOD, AND DEVICE

(71) Applicant: Huawei Technologies Co., Ltd., Shenzhen (CN)

(72) Inventors: Lei Chen, Shenzhen (CN); Xiaotong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/719,806

(22) Filed: Sep. 29, 2017

(65) Prior Publication Data

US 2018/0027463 A1 Jan. 25, 2018

Related U.S. Application Data

(63) Continuation of application No. PCT/CN2015/075561, filed on Mar. 31, 2015.

(51) Int. Cl.
| | |
|---|---|
| *H04W 36/08* | (2009.01) |
| *H04W 48/16* | (2009.01) |
| *H04W 36/36* | (2009.01) |
| *H04W 36/00* | (2009.01) |
| *H04W 84/12* | (2009.01) |

(52) U.S. Cl.
CPC ....... *H04W 36/08* (2013.01); *H04W 36/0061* (2013.01); *H04W 36/36* (2013.01); *H04W 48/16* (2013.01); *H04W 84/12* (2013.01)

(58) Field of Classification Search
CPC ..... H04W 48/12; H04W 36/36; H04W 36/08; H04W 36/0061; H04W 84/12
USPC ........................................................ 370/331
See application file for complete search history.

(56) References Cited

U.S. PATENT DOCUMENTS

| | | |
|---|---|---|
| 2007/0066304 A1 | 3/2007 | Lee |
| 2007/0217384 A1 | 9/2007 | Mani |
| 2008/0064404 A1 | 3/2008 | Zhang et al. |
| 2008/0076423 A1 | 3/2008 | Lee et al. |
| 2009/0286534 A1 | 11/2009 | Garg et al. |
| 2010/0067488 A1 | 3/2010 | Sashihara |
| 2010/0103931 A1 | 4/2010 | Sawada |
| 2011/0286437 A1* | 11/2011 | Austin .............. H04W 72/0413 370/338 |

(Continued)

FOREIGN PATENT DOCUMENTS

| | | |
|---|---|---|
| CN | 1929423 A | 3/2007 |
| CN | 101977382 A | 2/2011 |

(Continued)

OTHER PUBLICATIONS

Papaoulakis, N. et al., "A Proactive, Terminal Based Best Access Point Selection Mechanism for Wireless LANs," 2008 IEEE Globecom Workshops, Nov. 30, 2008, 4 pages.

*Primary Examiner* — Jae Y Lee
*Assistant Examiner* — Jean F Voltaire
(74) *Attorney, Agent, or Firm* — Slater Matsil, LLP

(57) ABSTRACT

A communication connection control method and a device, with the device configured to, when the device finds that communication service quality provided by an optimal wireless fidelity (Wi-Fi) access point is better than communication service quality provided by a currently connected Wi-Fi access point, the device automatically disconnects from the currently connected Wi-Fi access point, and initiates a connection request to the optimal Wi-Fi access point.

20 Claims, 6 Drawing Sheets

(56) References Cited

U.S. PATENT DOCUMENTS

| | | | | |
|---|---|---|---|---|
| 2013/0265958 A1* | 10/2013 | Hassan | ............... | H04W 48/16 370/329 |
| 2013/0279488 A1* | 10/2013 | Singh | ................... | H04W 4/80 370/338 |
| 2015/0036521 A1 | 2/2015 | Minamino | | |
| 2015/0052255 A1 | 2/2015 | Sun et al. | | |
| 2015/0117399 A1* | 4/2015 | Yang | ................... | H04W 36/18 370/331 |
| 2015/0189567 A1* | 7/2015 | Srivastava | ............ | H04W 36/32 370/332 |
| 2016/0014664 A1* | 1/2016 | Singh | ................... | H04W 36/30 370/332 |
| 2016/0119879 A1 | 4/2016 | Okamoto | | |

FOREIGN PATENT DOCUMENTS

| | | | |
|---|---|---|---|
| CN | 102917424 A | 2/2013 | |
| CN | 103607780 A | 2/2014 | |
| CN | 103634943 A | 3/2014 | |
| CN | 103686896 A | 3/2014 | |
| CN | 103686899 A | 3/2014 | |
| CN | 104106289 A | 10/2014 | |
| JP | 2004159258 A | 6/2004 | |
| JP | 2006005630 A | 1/2006 | |
| JP | 2006135716 A | 5/2006 | |
| JP | 2007124113 A | 5/2007 | |
| JP | 2008079305 A | 4/2008 | |
| JP | 2010109491 A | 5/2010 | |
| JP | 2014239292 A | 12/2014 | |
| JP | 2016535956 A | 11/2016 | |
| WO | 2010018529 A1 | 2/2010 | |
| WO | 2013112193 A1 | 8/2013 | |
| WO | WO 2013/112193 A1 * | 8/2013 | |
| WO | WO-2013112193 A1 * | 8/2013 | ............ H04W 24/02 |
| WO | 2014049950 A1 | 4/2014 | |
| WO | 2014148860 A1 | 9/2014 | |
| WO | 2014185431 A1 | 11/2014 | |
| WO | 2015023896 A2 | 2/2015 | |
| WO | 2015031271 A2 | 3/2015 | |

* cited by examiner

COMMUNICATION CONNECTION CONTROL METHOD, AND DEVICE

CROSS-REFERENCE TO RELATED APPLICATIONS

This application is a continuation of International Application No. PCT/CN2015/075561, filed on Mar. 31, 2015, the disclosure of which is hereby incorporated by reference in its entirety.

TECHNICAL FIELD

Embodiments of the present invention relate to the field of communications technologies, and in particular, to a communication connection control method, and a device.

BACKGROUND

With popularization of a Wi-Fi (Wireless-Fidelity, Wireless Fidelity) technology, an increasing quantity of users prefer to use a device having a Wi-Fi function, such as a mobile phone and an iPad, to enter a coverage area of a Wi-Fi access point, so that the device connects to the Wi-Fi access point to obtain communication service quality.

With wide deployment of the Wi-Fi access point, multiple Wi-Fi access points may cover a same area, and when a device is located in a common coverage area of multiple Wi-Fi access points, the device may find all the multiple Wi-Fi access points by searching, and establish a connection to one of the Wi-Fi access points. Specifically, when the device is located in a coverage area of a Wi-Fi access point 1, and is also located in a coverage area of a Wi-Fi access point 2, based on an existing Wi-Fi connection mechanism, the device establishes a connection to the Wi-Fi access point 1 or the Wi-Fi access point 2. Using the Wi-Fi access point 2 as an example, after the device establishes a connection to the Wi-Fi access point 2, if a user wants to obtain a communication service provided by the Wi-Fi access point 1, the user needs to manually switch the connected Wi-Fi access point to the Wi-Fi access point 1. Therefore, in the prior art, an intelligentization level of human computer interaction of a device is relatively low, causing inconvenience to a user.

SUMMARY

Embodiments of the present invention provide a communication connection control method and a device, so that a device establishes, in a timely manner, a connection to a Wi-Fi access point that provides best communication service quality and that is in at least one optional Wi-Fi access point.

According to a first aspect, an embodiment of the present invention provides a communication connection control method, where the control method applies to a device having a Wireless Fidelity Wi-Fi function, and the control method includes determining, by the device, an optimal Wi-Fi access point in at least one optional Wireless Fidelity Wi-Fi access point found by searching, determining, by the device according to information about the optimal Wi-Fi access point and information about a currently connected first Wi-Fi access point, that the optimal Wi-Fi access point meets a switch condition, and disconnecting, by the device, from the first Wi-Fi access point, and initiating a connection request to the optimal Wi-Fi access point.

With reference to the first aspect, in a first implementation manner, before the determining, by the device, an optimal Wi-Fi access point in at least one optional Wi-Fi access point found by searching, the control method further includes determining, by the device, that a trigger event of switching a Wi-Fi access point occurs, where the trigger event of switching a Wi-Fi access point includes at least any event or any combination of at least two events in the following events, including the device detects that signal strength of the first Wi-Fi access point decreases, the device learns that a location of the device changes, or the device detects that accessing a network through the first Wi-Fi access point fails or an access speed decreases.

With reference to the first aspect or the first implementation manner of the first aspect, in a second implementation manner, when the information is an identifier, the determining, by the device according to information about the optimal Wi-Fi access point and information about a currently connected first Wi-Fi access point, that the optimal Wi-Fi access point meets a switch condition includes determining, by the device, that an identifier of the optimal Wi-Fi access point and an identifier of the currently connected first Wi-Fi access point are different, or, when the information is a quality parameter, determining, by the device according to information about the optimal Wi-Fi access point and information about a currently connected first Wi-Fi access point, that the optimal Wi-Fi access point and the first Wi-Fi access point meet a switch condition includes determining, by the device according to a quality parameter of the optimal Wi-Fi access point and a quality parameter of the first Wi-Fi access point, that communication service quality provided by the optimal Wi-Fi access point is better than communication service quality provided by the first Wi-Fi access point, where the quality parameter is at least one of the following parameters: a priority of the Wi-Fi access point, signal strength of the Wi-Fi access point, network bandwidth of the Wi-Fi access point, an access speed of the Wi-Fi access point, or a distance between a location of the Wi-Fi access point and the device.

With reference to any one of the first aspect to the second implementation manner of the first aspect, in a third implementation manner, before the determining, by the device, an optimal Wi-Fi access point in at least one optional Wi-Fi access point found by searching, the control method further includes determining, by the device according to historical information stored in the device, and in all Wi-Fi access points found by searching, that at least one Wi-Fi access point, whose identifier exists in the historical information, is the at least one optional Wi-Fi access point, where the historical information includes at least an identifier of at least one second Wi-Fi access point, where the second Wi-Fi access point is a Wi-Fi access point to which the device successfully connects.

With reference to any one of the first aspect to the third implementation manner of the first aspect, in a fourth implementation manner, the determining, by the device, an optimal Wi-Fi access point in at least one optional Wi-Fi access point found by searching includes determining, by the device according to signal strength of each optional Wi-Fi access point, that a Wi-Fi access point having highest signal strength is the optimal Wi-Fi access point.

With reference to any one of the first aspect to the third implementation manner of the first aspect, in a fifth implementation manner, the determining, by the device, an optimal Wi-Fi access point in at least one optional Wi-Fi access point found by searching includes selecting, by the device according to a location of each optional Wi-Fi access point and the location of the device, a Wi-Fi access point closest to the device as the optimal Wi-Fi access point, where a location of any Wi-Fi access point found by searching by the device is obtained by the device from the Wi-Fi access point or a remote server.

With reference to any one of the first aspect to the third implementation manner of the first aspect, in a sixth implementation manner, the determining, by the device, an optimal Wi-Fi access point in at least one optional Wi-Fi access point found by searching includes selecting, by the device according to network bandwidth of each optional Wi-Fi access point and in the at least one optional Wi-Fi access point found by searching, a Wi-Fi access point having largest network bandwidth as the optimal Wi-Fi access point, where network bandwidth of any Wi-Fi access point found by searching by the device is sent by the Wi-Fi access point to the device, or is learned by the device by means of detection on the Wi-Fi access point.

With reference to any one of the first aspect to the third implementation manner of the first aspect, in a seventh implementation manner, the determining, by the device, an optimal Wi-Fi access point in at least one optional Wi-Fi access point found by searching includes determining, by the device according to an access speed of each optional Wi-Fi access point, that an optional Wi-Fi access point having a highest access speed is the optimal Wi-Fi access point, where an access speed of any Wi-Fi access point found by searching by the device is sent by the Wi-Fi access point to the device, or is learned by the device by means of detection on the Wi-Fi access point.

With reference to the third implementation manner of the first aspect, in an eighth implementation manner, if the historical information further includes a time corresponding to the identifier of each second Wi-Fi access point, where the time is a tine at which the device successfully connects to the second Wi-Fi access point, the determining, by the device, an optimal Wi-Fi access point in at least one optional Wi-Fi access point found by searching includes querying, by the device, the historical information according to an identifier of each optional Wi-Fi access point to obtain a time corresponding to the identifier of each optional Wi-Fi access point; and selecting, by the device in the at least one optional Wi-Fi access point, an optional Wi-Fi access point, whose identifier is corresponding to a time point that is closest to a current moment, as the optimal Wi-Fi access point.

With reference to the third implementation manner of the first aspect, in a ninth implementation manner, if the historical information further includes a priority corresponding to the identifier of each second Wi-Fi access point, the determining, by the device, an optimal Wi-Fi access point in at least one optional Wi-Fi access point found by searching includes querying, by the device, the historical information according to an identifier of each optional Wi-Fi access point to obtain a priority corresponding to the identifier of each optional Wi-Fi access point, and selecting, by the device in the at least one optional Wi-Fi access point, an optional Wi-Fi access point, whose identifier is corresponding to a highest priority, as the optimal Wi-Fi access point.

With reference to any one of the first aspect to the ninth implementation manner of the first aspect, in a tenth implementation manner, the control method further includes when the device fails to connect to the optimal Wi-Fi access point, performing, by the device, an operation of establishing a connection to the first Wi-Fi access point.

With reference to any one of the first aspect to the ninth implementation manner of the first aspect, in an eleventh implementation manner, the control method further includes when the device fails to access a network through the optimal Wi-Fi access point, performing, by the device, an operation of establishing a connection to the first Wi-Fi access point.

According to a second aspect, an embodiment of the present invention provides a device, where the device has a Wireless Fidelity Wi-Fi function, and includes a first determining module, configured to determine an optimal Wi-Fi access point in at least one optional Wireless Fidelity Wi-Fi access point found by searching, a second determining module, configured to determine, according to information about the optimal Wi-Fi access point and information about a currently connected first Wi-Fi access point, that the optimal Wi-Fi access point meets a switch condition, and a switching module, configured to disconnect from the first Wi-Fi access point, and initiate a connection request to the optimal Wi-Fi access point.

With reference to the second aspect, in a first implementation manner, the device further includes a third determining module, configured to determine that a trigger event of switching a Wi-Fi access point occurs, where the trigger event of switching a Wi-Fi access point includes at least any event or any combination of at least two events in the following events, including the device detects that signal strength of the first Wi-Fi access point decreases, the device learns that a location of the device changes, or the device detects that accessing a network through the first Wi-Fi access point fails or an access speed decreases.

With reference to the second aspect or the first implementation manner of the second aspect, in a second implementation manner, when the information is an identifier, the second determining module is specifically configured to determine that an identifier of the optimal Wi-Fi access point and an identifier of the currently connected first Wi-Fi access point are different, or when the information is a quality parameter, the second determining module is specifically configured to determine, according to a quality parameter of the optimal Wi-Fi access point and a quality parameter of the first Wi-Fi access point, that communication service quality provided by the optimal Wi-Fi access point is better than communication service quality provided by the first Wi-Fi access point, where the quality parameter is at least one of the following parameters, including a priority of the Wi-Fi access point, signal strength of the Wi-Fi access point, network bandwidth of the Wi-Fi access point, an access speed of the Wi-Fi access point, or a distance between a location of the Wi-Fi access point and the device.

With reference to any one of the second aspect to the second implementation manner of the second aspect, in a third implementation manner, the first determining module is further configured to determine, according to historical information stored in the device, and in all Wi-Fi access points found by searching, that at least one Wi-Fi access point, whose identifier exists in the historical information, is the at least one optional Wi-Fi access point, where the historical information includes at least an identifier of at least one second Wi-Fi access point, where the second Wi-Fi access point is a Wi-Fi access point to which the device successfully connects.

With reference to any one of the second aspect to the third implementation manner of the second aspect, in a fourth implementation manner, the first determining module is specifically configured to determine, according to signal strength of each optional Wi-Fi access point, that a Wi-Fi access point having highest signal strength is the optimal Wi-Fi access point.

With reference to any one of the second aspect to the third implementation manner of the second aspect, in a fifth implementation manner, the first determining module is specifically configured to select, according to a location of each optional Wi-Fi access point and the location of the device, a Wi-Fi access point closest to the device as the optimal Wi-Fi access point, where a location of any Wi-Fi access point found by searching by the device is obtained by the device from the Wi-Fi access point or a remote server.

With reference to any one of the second aspect to the third implementation manner of the second aspect, in a sixth implementation manner, the first determining module is specifically configured to select, according to network bandwidth of each optional Wi-Fi access point and in the at least one optional Wi-Fi access point found by searching, a Wi-Fi access point having largest network bandwidth as the optimal Wi-Fi access point, where network bandwidth of any Wi-Fi access point found by searching by the device is sent by the Wi-Fi access point to the device, or is learned by the device by means of detection on the Wi-Fi access point.

With reference to any one of the second aspect to the third implementation manner of the second aspect, in a seventh implementation manner, the first determining module is specifically configured to determine, according to an access speed of each optional Wi-Fi access point, that an optional Wi-Fi access point having a highest access speed is the optimal Wi-Fi access point, where an access speed of any Wi-Fi access point found by searching by the device is sent by the Wi-Fi access point to the device, or is learned by the device by means of detection on the Wi-Fi access point.

With reference to the third implementation manner of the second aspect, in an eighth implementation manner, if the historical information further includes a time corresponding to the identifier of each second Wi-Fi access point, where the time is a time at which the device successfully connects to the second Wi-Fi access point, the first determining module is specifically configured to query the historical information according to an identifier of each optional Wi-Fi access point to obtain a time corresponding to the identifier of each optional Wi-Fi access point, and the device selects, in the at least one optional Wi-Fi access point, an optional Wi-Fi access point, whose identifier is corresponding to a time point that is closest to a current moment, as the optimal Wi-Fi access point.

With reference to the third implementation manner of the second aspect, in a ninth implementation manner, if the historical information further includes a priority corresponding to the identifier of each second Wi-Fi access point, the first determining module is specifically configured to query the historical information according to an identifier of each optional Wi-Fi access point to obtain a priority corresponding to the identifier of each optional Wi-Fi access point, and the first determining module is specifically configured to select, in the at least one optional Wi-Fi access point, an optional Wi-Fi access point, whose identifier is corresponding to a highest priority, as the optimal Wi-Fi access point.

With reference to any one of the second aspect to the ninth implementation manner of the second aspect, in a tenth implementation manner, the switching module is further configured to, when the device fails to connect to the optimal Wi-Fi access point, perform an operation of establishing a connection to the first Wi-Fi access point.

With reference to any one of the second aspect to the ninth implementation manner of the second aspect, in an eleventh implementation manner, the switching module is further configured to, when the device fails to access a network through the optimal Wi-Fi access point, perform an operation of establishing a connection to the first Wi-Fi access point.

According to a third aspect, an embodiment of the present invention provides a device, where the device has a Wireless Fidelity (Wi-Fi) function, and includes a processor and a transceiver, where the processor is configured to determine an optimal Wi-Fi access point in at least one optional Wi-Fi access point found by searching, the processor is configured to determine, according to information about the optimal Wi-Fi access point and information about a currently connected first Wi-Fi access point, that the optimal Wi-Fi access point meets a switch condition, and the transceiver is configured to disconnect from the first Wi-Fi access point, and initiate a connection request to the optimal Wi-Fi access point.

With reference to the third aspect, in a first implementation manner, the processor is further configured to determine that a trigger event of switching a Wi-Fi access point occurs, where the trigger event of switching a Wi-Fi access point includes at least any event or any combination of at least two events in the following events, including the device detects that signal strength of the first Wi-Fi access point decreases, the device learns that a location of the device changes, or the device detects that accessing a network through the first Wi-Fi access point fails or an access speed decreases.

With reference to the third aspect or the first implementation manner of the third aspect, in a second implementation manner, when the information is an identifier, and the processor is configured to determine, according to the information about the optimal Wi-Fi access point and the information about the currently connected first Wi-Fi access point, that the optimal Wi-Fi access point meets the switch condition, the processor is specifically configured to determine that an identifier of the optimal Wi-Fi access point and an identifier of the currently connected first Wi-Fi access point are different, or, when the information is a quality parameter, and the processor is configured to determine, according to the information about the optimal Wi-Fi access point and the information about the currently connected first Wi-Fi access point, that the optimal Wi-Fi access point meets the switch condition, the processor is specifically configured to determine, according to a quality parameter of the optimal Wi-Fi access point and a quality parameter of the first Wi-Fi access point, that communication service quality provided by the optimal Wi-Fi access point is better than communication service quality provided by the first Wi-Fi access point, where the quality parameter is at least one of the following parameters including a priority of the Wi-Fi access point, signal strength of the Wi-Fi access point, network bandwidth of the Wi-Fi access point, an access speed of the Wi-Fi access point, or a distance between a location of the Wi-Fi access point and the device.

With reference to any one of the third aspect to the second implementation manner of the third aspect, in a third implementation manner, the device further includes a memory, which is configured to store historical information, where the processor is further configured to determine, according to historical information stored in the memory, and in all Wi-Fi access points found by searching, that at least one Wi-Fi access point, whose identifier exists in the historical information, is the at least one optional Wi-Fi access point, where the historical information includes at least an identifier of at least one second Wi-Fi access point, where the second Wi-Fi access point is a Wi-Fi access point to which the device successfully connects.

With reference to any one of the third aspect to the third implementation manner of the third aspect, in a fourth implementation manner, when the processor is configured to determine, according to the information about the optimal Wi-Fi access point and the information about the currently connected first Wi-Fi access point, that the optimal Wi-Fi access point meets the switch condition, the processor is specifically configured to determine, according to signal strength of each optional Wi-Fi access point, that a Wi-Fi access point having highest signal strength is the optimal Wi-Fi access point.

With reference to any one of the third aspect to the third implementation manner of the third aspect, in a fifth implementation manner, when the processor is configured to determine, according to the information about the optimal Wi-Fi access point and the information about the currently connected first Wi-Fi access point, that the optimal Wi-Fi access point meets the switch condition, the processor is specifically configured to select, according to a location of each optional Wi-Fi access point and the location of the device, a Wi-Fi access point closest to the device as the optimal Wi-Fi access point, where a location of any Wi-Fi access point found by searching by the device is obtained from the Wi-Fi access point or a remote server by the transceiver triggered by the processor.

With reference to any one of the third aspect to the third implementation manner of the third aspect, in a sixth implementation manner, when the processor is configured to determine, according to the information about the optimal Wi-Fi access point and the information about the currently connected first Wi-Fi access point, that the optimal Wi-Fi access point meets the switch condition, the processor is specifically configured to select, according to network bandwidth of each optional Wi-Fi access point and in the at least one optional Wi-Fi access point found by searching, a Wi-Fi access point having largest network bandwidth as the optimal Wi-Fi access point, where network bandwidth of any Wi-Fi access point found by searching by the device is sent by the Wi-Fi access point to the device, or is learned by the device by means of detection on the Wi-Fi access point.

With reference to any one of the third aspect to the third implementation manner of the third aspect, in a seventh implementation manner, when the processor is configured to determine, according to the information about the optimal Wi-Fi access point and the information about the currently connected first Wi-Fi access point, that the optimal Wi-Fi access point meets the switch condition, the processor is specifically configured to determine, according to an access speed of each optional Wi-Fi access point, that an optional Wi-Fi access point having a highest access speed is the optimal Wi-Fi access point, where an access speed of any Wi-Fi access point found by searching by the device is sent by the Wi-Fi access point to the device, or is learned by the device by means of detection on the Wi-Fi access point.

With reference to the third implementation manner of the third aspect, in an eighth implementation manner, if the historical information further includes a time corresponding to the identifier of each second Wi-Fi access point, where the time is a time at which the device successfully connects to the second Wi-Fi access point, when the processor is configured to determine, according to the information about the optimal Wi-Fi access point and the information about the currently connected first Wi-Fi access point, that the optimal Wi-Fi access point meets the switch condition, the processor is specifically configured to query the historical information according to an identifier of each optional Wi-Fi access point to obtain a time corresponding to the identifier of each optional Wi-Fi access point, and the device selects, in the at least one optional Wi-Fi access point, an optional Wi-Fi access point, whose identifier is corresponding to a time point that is closest to a current moment, as the optimal Wi-Fi access point.

With reference to the third implementation manner of the third aspect, in a ninth implementation manner, if the historical information further includes a priority corresponding to the identifier of each second Wi-Fi access point, when the processor is configured to determine, according to the information about the optimal Wi-Fi access point and the information about the currently connected first Wi-Fi access point, that the optimal Wi-Fi access point meets the switch condition, the processor is specifically configured to query the historical information according to an identifier of each optional Wi-Fi access point to obtain a priority corresponding to the identifier of each optional Wi-Fi access point, and the device selects, in the at least one optional Wi-Fi access point, an optional Wi-Fi access point, whose identifier is corresponding to a highest priority, as the optimal Wi-Fi access point.

With reference to any one of the third aspect to the ninth implementation manner of the third aspect, in a tenth implementation manner, the transceiver is further configured to: when the device fails to connect to the optimal Wi-Fi access point, perform an operation of establishing a connection to the first Wi-Fi access point.

With reference to any one of the third aspect to the ninth implementation manner of the third aspect, in an eleventh implementation manner, the transceiver is further configured to: when the device fails to access a network through the optimal Wi-Fi access point, perform an operation of establishing a connection to the first Wi-Fi access point.

According to the communication connection control method and the device provided in the embodiments of the present invention, when a device finds that communication service quality provided by an optimal Wi-Fi access point is better than communication service quality provided by a currently connected Wi-Fi access point, the device automatically disconnects from the currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
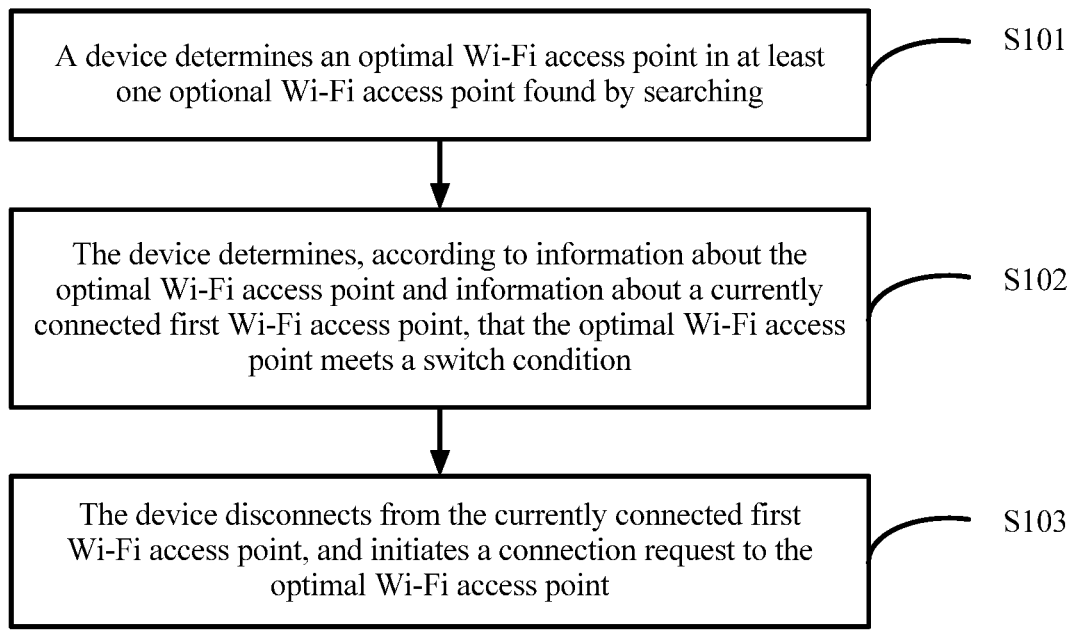
FIG. 1 is a schematic flowchart of Embodiment 1 of a communication connection control method according to the present invention.
Figure 2:
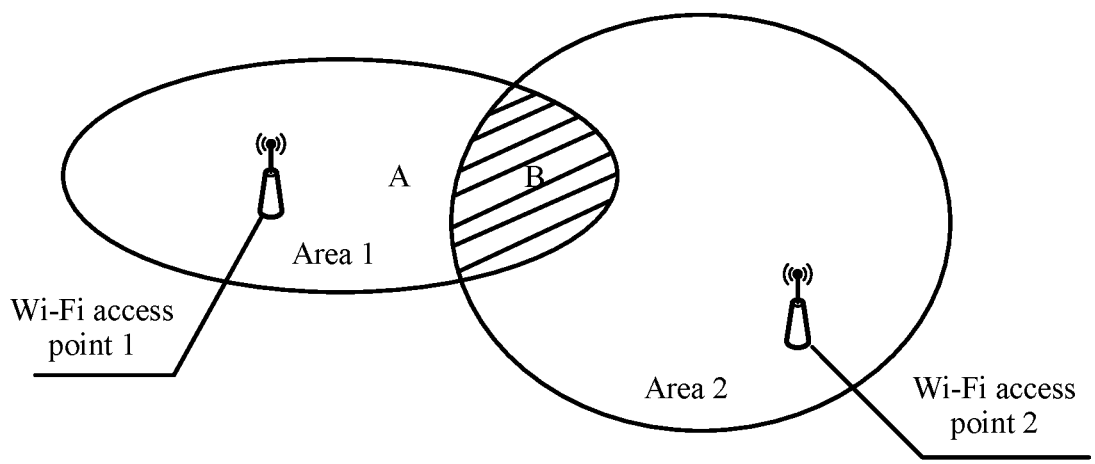
FIG. 2 is a schematic diagram of an application scenario of Embodiment 1 of a communication connection control method according to the present invention.

FIG. 1 is a schematic flowchart of Embodiment 1 of a communication connection control method according to the present invention. FIG. 2 is a schematic diagram of an application scenario of Embodiment 1 of a communication connection control method according to the present invention. As shown in FIG. 1 and FIG. 2, coverage areas of a Wi-Fi access point 1 and a Wi-Fi access point 2 are respectively an area 1 and an area 2, and there is an overlapping area S between the area 1 and the area 2. When a device having a Wi-Fi function, such as a mobile phone or an iPad, is located in a location A, the device finds only a signal of the Wi-Fi access point 1 by searching, that is, finds only one optional Wi-Fi access point by searching, that is, the Wi-Fi access point 1, and the device automatically initiates a connection request to the Wi-Fi access point 1. When the device is located in a location B, in addition to the signal of the currently connected Wi-Fi access point 1, the device may further find a signal of a Wi-Fi access point 2 by searching, and in this case, the device finds two optional Wi-Fi access points by searching. To obtain better communication service quality in a timely manner, in this embodiment, a communication connection between a device and an optional Wi-Fi access point is controlled according to the following steps.

S101. The device determines an optimal Wi-Fi access point in at least one optional Wi-Fi access point found by searching.

Specifically, the device may determine, according to a preset method, the optimal Wi-Fi access point in the at least one optional Wireless Fidelity Wi-Fi access point found by searching. The foregoing preset method may be a network speed selection method, a signal strength selection method, or the like. Specifically, the network speed selection method is selecting, in the at least one optional Wireless Fidelity Wi-Fi access point found by searching, a Wi-Fi access point providing a highest network speed as the optimal Wi-Fi access point. The signal strength selection method is selecting, in the at least one optional Wireless Fidelity Wi-Fi access point found by searching, a Wi-Fi access point having highest signal strength as the optimal Wi-Fi access point.

Specifically, when finding a signal of a specific Wi-Fi access point by searching, the device obtains an identifier of the Wi-Fi access point, such as an SSID (Service Set Identifier, service set identifier), protocol information, signal strength, or a network speed. For example, the signal strength selection method is used as the preset method, and the device may learn signal strength of each optional Wi-Fi access point. Generally, a Wi-Fi access point having high signal strength may provide relatively good communication service quality for the device, and therefore when the signal strength selection method is used, in the at least one optional Wi-Fi access point, a Wi-Fi access point having highest signal strength is determined as the optimal Wi-Fi access point.

S102. The device determines, according to information about the optimal Wi-Fi access point and information about a currently connected first Wi-Fi access point, that the optimal Wi-Fi access point meets a switch condition.

The foregoing information about the optimal Wi-Fi access point may be specifically an identifier or a quality parameter, or the like of the optimal Wi-Fi access point. Correspondingly, the information about the first Wi-Fi access point is an identifier or a quality parameter, or the like of the first Wi-Fi access point. The quality parameter may be signal strength, network bandwidth, or the like. In actual application, correspondingly, the foregoing switch condition varies according to different specific content of the information. For example, when the information about the optimal Wi-Fi access point is the identifier of the optimal Wi-Fi access point, the information about the first Wi-Fi access point is the identifier of the first Wi-Fi access point, and therefore the switch condition is whether the identifiers are consistent; or when the information about the optimal Wi-Fi access point is the quality parameter of the optimal Wi-Fi access point, the information about the first Wi-Fi access point is the quality parameter of the first Wi-Fi access point, and therefore the switch condition is that communication service quality that is provided by the first Wi-Fi access point and that is represented by the quality parameter of the first Wi-Fi access point is poorer than communication service quality that is provided by the optimal Wi-Fi access point and that is represented by the quality parameter of the optimal Wi-Fi access point.

Specifically, when the device searches for a Wi-Fi access point, a signal of the first Wi-Fi access point is also found by searching, and when S101 is performed, based on a possible preset method, optionally, the at least one optional Wi-Fi access point does not include the first Wi-Fi access point, and in this case, if the signal strength selection method is used to perform S101, signal strength of a determined optimal Wi-Fi access point may be lower than that of the first Wi-Fi access point. In this case, to obtain better communication service quality, the device does not disconnect from the first Wi-Fi access point, and therefore, after the device determines the optimal Wi-Fi access point, signal strength needs to be used as the foregoing information about the Wi-Fi access point, so as to determine whether the optimal Wi-Fi access point and the first Wi-Fi access point meet the switch condition, that is, when signal strength of the optimal Wi-Fi access point is higher than the signal strength of the first Wi-Fi access point, it indicates that the optimal Wi-Fi access point and the first Wi-Fi access point meet the switch condition.

Alternatively, the at least one optional Wi-Fi access point includes the first Wi-Fi access point, and in this case, if the signal strength selection method is used to perform S101, a determined optimal Wi-Fi access point is the first Wi-Fi access point, and the device does not disconnect from the first Wi-Fi access point, and therefore, after the device determines the optimal Wi-Fi access point, an identifier needs to be used as the foregoing information about the Wi-Fi access point to determine whether the optimal Wi-Fi access point and the first Wi-Fi access point meet the switch condition, that is, when the identifier of the optimal Wi-Fi access point and the identifier of the first Wi-Fi access point are different, the optimal Wi-Fi access point and the first Wi-Fi access point meet the switch condition.

S103. The device disconnects from the currently connected first Wi-Fi access point, and initiates a connection request to the optimal Wi-Fi access point.

The device is located in coverage areas of multiple Wi-Fi access points, but at a same moment, the device connects to only one Wi-Fi access point. Therefore, to differentiate from an unconnected Wi-Fi access point, in this embodiment, a Wi-Fi access point to which the device currently connects is referred to as a first Wi-Fi access point. For example, the device establishes, in the location A shown in FIG. 2, a connection to the Wi-Fi access point 1, and then the device moves to the location B, and in this case, the Wi-Fi access point 1 is the first Wi-Fi access point. In S101, the device determines the optimal Wi-Fi access point as the Wi-Fi access point 2, and therefore, the device disconnects from the Wi-Fi access point 1, and initiates the connection request to the Wi-Fi access point 2.

In this embodiment, when a device finds that communication service quality provided by an optimal Wi-Fi access point is better than communication service quality provided by a currently connected Wi-Fi access point, the device automatically disconnects from the currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 3:
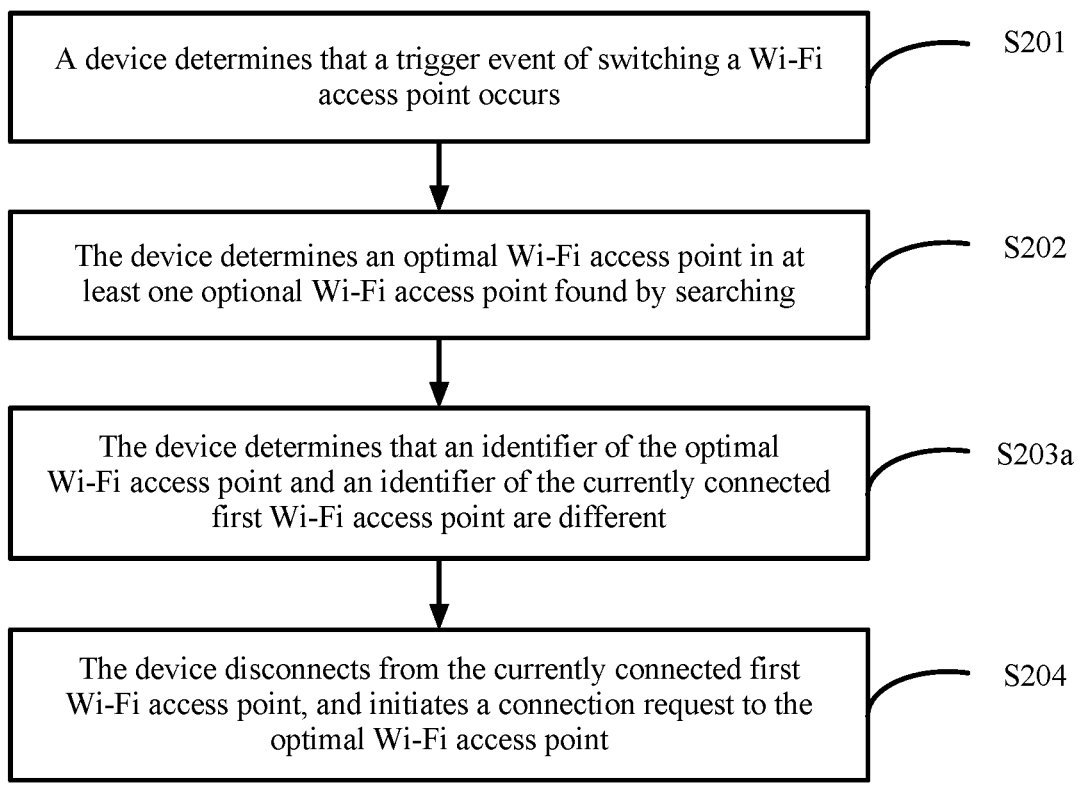
FIG. 3 is a schematic flowchart of Embodiment 2 of a communication connection control method according to the present invention.

FIG. 3 is a schematic flowchart of Embodiment 2 of a communication connection control method according to the present invention. As shown in FIG. 3, this embodiment of the present invention gives a further description on the basis of the embodiment shown in FIG. 1, and this embodiment may also use the application scenario shown in FIG. 2. Details are as follows.

S201. The device determines that a trigger event of switching a Wi-Fi access point occurs.

The foregoing trigger event of switching a Wi-Fi access point includes at least any event or any combination of at least two events in the following events, including the device detects that the signal strength of the first Wi-Fi access point decreases; the device senses that a movement status of the device changes (for example, sensing by using displacement sensors such as an acceleration sensor and a direction sensor); or the device learns that a location of the device changes, for example, determining, by using a GPS (Global Positioning System, Global Positioning System) module inside the device, that the location of the device changes; or the device detects that accessing a network through the first Wi-Fi access point fails or an access speed decreases.

S202. The device determines an optimal Wi-Fi access point in at least one optional Wi-Fi access point found by searching.

Flexibly, different quality parameters may be used to measure communication service quality provided by a Wi-Fi access point. For example, it may be considered that a Wi-Fi access point having high signal strength provides good communication service quality; or it may be considered that a Wi-Fi access point having large network bandwidth provides good communication service quality; or in consideration of a fact that a shorter distance between a device and a Wi-Fi access point leads to higher received signal strength of the Wi-Fi access point, communication service quality provided by a Wi-Fi access point may be estimated according to a distance between the Wi-Fi access point and the device; or possibly, during deployment of a Wi-Fi access point, operation and maintenance personnel set different priorities for all Wi-Fi access points according to communication service quality provided by each Wi-Fi access point and based on an order of good to poor communication service quality, so as to notify the device of communication service quality provided by each Wi-Fi access point. That is, during the deployment of the Wi-Fi access point, a Wi-Fi access point having a highest priority provides best communication service quality, and a Wi-Fi access point having a lowest priority provides communication service quality poorer than that provided by remaining Wi-Fi access points in the deployed Wi-Fi access points; or the device locally sets different priorities for all Wi-Fi access points according to communication service quality provided by a Wi-Fi access point to which the device has connected, that is, in Wi-Fi access points to which the device has connected, a Wi-Fi access point having a highest priority provides best communication service quality, and a Wi-Fi access point having a lowest priority provides communication service quality poorer than that provided by remaining Wi-Fi access points that are in Wi-Fi access points to which the device has connected. It may be learned that in this embodiment, there are many optional manners for determining the optimal Wi-Fi access point.

The device may determine the optimal Wi-Fi access point according to the preset method. For example, when the preset method is the signal strength selection method, the device determines, according to signal strength of each optional Wi-Fi access point, that a Wi-Fi access point having the highest signal strength is the optimal Wi-Fi access point; or when the preset method is a distance selection method, the device selects, according to a location of each optional Wi-Fi access point and the location of the device, a Wi-Fi access point closest to the device as the optimal Wi-Fi access point; or when the preset method is a network bandwidth selection method, the device selects, according to network bandwidth of each optional Wi-Fi access point and in the at least one Wi-Fi access point found by searching, a Wi-Fi access point having largest network bandwidth as the optimal Wi-Fi access point; or when the preset method is the network speed selection method, the device determines, according to a network speed of each optional Wi-Fi access point, that an optional Wi-Fi access point providing a highest network speed is the optimal Wi-Fi access point; or when the preset method is a priority selection method, the device determines, according to a priority of each optional Wi-Fi access point, that an optional Wi-Fi access point having a highest priority is the optimal Wi-Fi access point.

It should be noted that, generally, after enabling a Wi-Fi function, a device searches around for a signal of a Wi-Fi access point in a preset cycle. Because a signal of a Wi-Fi access point carries information, such as an identifier of the Wi-Fi access point, when finding the signal of the Wi-Fi access point by searching, the device obtains the identifier of the Wi-Fi access point, and may also detect signal strength of the Wi-Fi access point at the same time. Possibly, during deployment of the Wi-Fi access point, information such as network bandwidth and a network speed of a network connected to the Wi-Fi access point is also set in the Wi-Fi access point, so that when finding the signal of the Wi-Fi access point by searching, the device also receives network bandwidth, a network speed, and the like that are sent by the Wi-Fi access point; or the device may attempt to connect to the Wi-Fi access point to detect the network bandwidth and the network speed of the network connected to the Wi-Fi access point for use in subsequent determining of the optimal Wi-Fi access point. In addition, a deployment location of the Wi-Fi access point may also be set in the Wi-Fi access point, so that when finding the signal of the Wi-Fi access point by searching, the device also receives location information sent by the Wi-Fi access point, or the device sends an identifier of the Wi-Fi access point to a remote server (for example, a Google map server), and receives location information fed back by the remote server. Therefore, network bandwidth of any Wi-Fi access point found by searching by the device is sent by the Wi-Fi access point to the device, or is learned by the device by means of detection on the Wi-Fi access point; a network speed of any Wi-Fi access point found by searching by the device is sent by the Wi-Fi access point to the device, or is learned by the device by means of detection on the Wi-Fi access point; and an access speed of any Wi-Fi access point found by searching by the device is sent by the Wi-Fi access point to the device, or is learned by the device by means of detection on the Wi-Fi access point.

S203a. The device determines that an identifier of the optimal Wi-Fi access point and an identifier of the currently connected first Wi-Fi access point are different.

Alternatively, S203b is performed instead of S203a.

S203b. The device determines, according to a quality parameter of the optimal Wi-Fi access point and a quality parameter of the first Wi-Fi access point, whether communication service quality provided by the optimal Wi-Fi access point is better than communication service quality provided by the first Wi-Fi access point.

The quality parameter is any one of the following parameters, including signal strength of the Wi-Fi access point, network bandwidth of the Wi-Fi access point, an access speed of the Wi-Fi access point, or a distance between a location of the Wi-Fi access point and the device.

In the embodiment shown in FIG. 3, S203a is used as an example.

S204. The device disconnects from the currently connected first Wi-Fi access point, and initiates a connection request to the optimal Wi-Fi access point.

In this embodiment of the present invention, each time determining that a trigger event of switching a Wi-Fi access point occurs, a device immediately searches for an optimal Wi-Fi access point, and after determining an optimal Wi-Fi access point that needs to be selected, the device automatically disconnects from a currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 4:
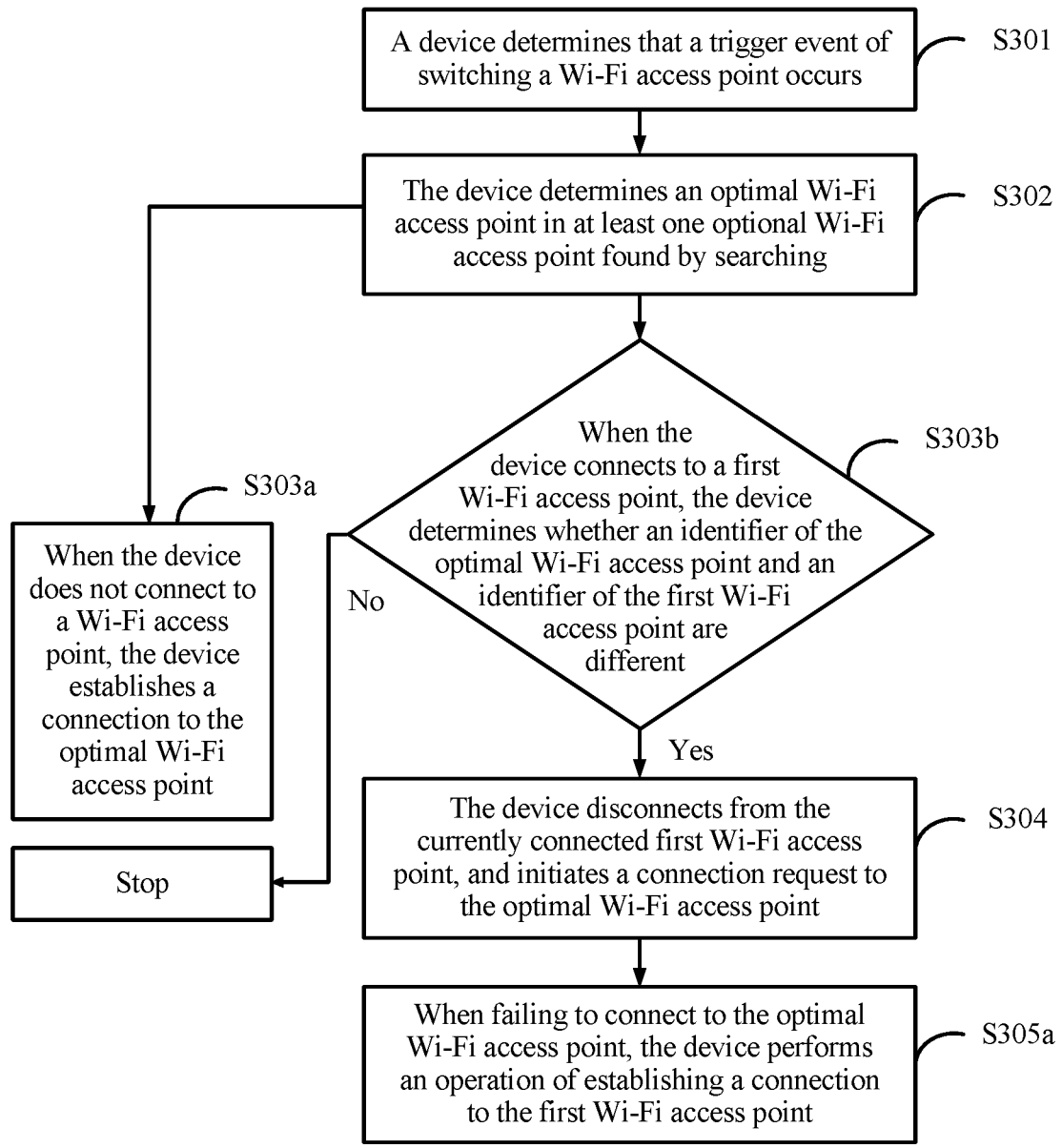
FIG. 4 is a schematic flowchart of Embodiment 3 of a communication connection control method according to the present invention.

FIG. 4 is a schematic flowchart of Embodiment 3 of a communication connection control method according to the present invention. As shown in FIG. 4, this embodiment gives a further description on the basis of the embodiment shown in FIG. 1 or FIG. 3, and specifically includes the following steps.

S301. The device determines that the trigger event of switching a Wi-Fi access point occurs.

S302. The device determines the optimal Wi-Fi access point in the at least one optional Wi-Fi access point found by searching.

For a specific determining method, refer to the foregoing embodiments. In addition, because the device can automatically and periodically search around for a signal of a Wi-Fi access point, the foregoing at least one optional Wi-Fi access point may be found by searching before S301, but possibly, the device is triggered by the trigger event of switching a Wi-Fi access point to search for an optional Wi-Fi access point, that is, before S302, the device further needs to perform the step of searching for an optional Wi-Fi access point.

S303a. When the device does not connect to a Wi-Fi access point, the device establishes a connection to the optimal Wi-Fi access point.

It should be additionally noted that when the device does not connect to a Wi-Fi access point, before S302, when the device performs the step of searching for an optional Wi-Fi access point, the device may not find an optional Wi-Fi access point by searching, and in this case, this step stops, that is, steps subsequent to S302 are not performed.

S303b. When the device connects to the first Wi-Fi access point, the device determines whether the identifier of the optimal Wi-Fi access point and the identifier of the first Wi-Fi access point are different. If the identifier of the optimal Wi-Fi access point and the identifier of the first Wi-Fi access point are different, perform S304; or if the identifier of the optimal Wi-Fi access point and the identifier of the first Wi-Fi access point are not different, the process stops.

It should be additionally noted that when the device connects to the first Wi-Fi access point, before S302, the device may find at least the signal of the first Wi-Fi access point by searching, that is, there is certainly at least one optional Wi-Fi access point. That is, the device also uses the currently connected Wi-Fi access point as an optional Wi-Fi access point, so as to determine an optimal Wi-Fi access point, and therefore, possibly, the determined optimal Wi-Fi access point is the currently connected first Wi-Fi access point, and therefore, the device maintains the connection to the first Wi-Fi access point, that is, the process stops; or when the optimal Wi-Fi access point is not the first Wi-Fi access point, that is, another Wi-Fi access point to which the device does not connect provides communication service quality better than that provided by the first Wi-Fi access point, and switching needs to be performed.

In this embodiment, FIG. 4 uses S303b as an example, and optionally, S303b may be replaced with the following S303c.

S303c. When the device connects to the first Wi-Fi access point, the device determines, according to the quality parameter of the optimal Wi-Fi access point and the quality parameter of the first Wi-Fi access point, whether the communication service quality provided by the optimal Wi-Fi access point is better than the communication service quality provided by the first Wi-Fi access point. If the communication service quality provided by the optimal Wi-Fi access point is better than the communication service quality provided by the first Wi-Fi access point, perform S304; or if the communication service quality provided by the optimal Wi-Fi access point is not better than the communication service quality provided by the first Wi-Fi access point, the process stops.

Possibly, in S301, the device is triggered to find the optimal Wi-Fi access point, and the device determines the optimal Wi-Fi access point in other Wi-Fi access points except the first Wi-Fi access point. That is, the foregoing optional Wi-Fi access point does not include the first Wi-Fi access point, and therefore, possibly, before S302, when searching for the optional Wi-Fi access point, in addition to the signal of the first Wi-Fi access point, the device does not find a signal of another Wi-Fi access point by searching, and therefore, a quantity of the determined optional Wi-Fi access point is zero, and the process stops, that is, steps subsequent to S302 are not performed.

However, even if the first Wi-Fi access point is not considered, the device also finds an optional Wi-Fi access point by searching, and in this case, communication service quality provided by the optimal Wi-Fi access point that is determined in optional Wi-Fi access points that do not include the first Wi-Fi access point may not be better than that provided by the first Wi-Fi access point. When the communication service quality provided by the optimal Wi-Fi access point is not better than the communication service quality provided by the first Wi-Fi access point, switching does not need to be performed, that is, the process stops; or when the communication service quality provided by the first Wi-Fi access point is poorer than the communication service quality provided by the optimal Wi-Fi access point, switching is performed.

S304. The device disconnects from the currently connected first Wi-Fi access point, and initiates a connection request to the optimal Wi-Fi access point.

When the connection request is initiated to the optimal Wi-Fi access point, if the optimal Wi-Fi access point is a public Wi-Fi access point, the device may directly connect to the optimal Wi-Fi access point; or if the optimal Wi-Fi access point is not a public Wi-Fi access point, in which a password is set, the device needs to provide a password. The password may be a password that has been stored in the device. For example, before this embodiment, the device has used a password entered by a user to connect to the optimal Wi-Fi access point, the device stores the password, and therefore, when connecting to the optimal Wi-Fi access point again, the device automatically provides the stored password. However, before this embodiment, if the device has not connected to the optimal Wi-Fi access point, the device prompts the user to enter a password.

S305a. When failing to connect to the optimal Wi-Fi access point, the device performs an operation of establishing a connection to the first Wi-Fi access point.

Possibly, the foregoing S305a may be replaced with the following S305b. FIG. 4 uses S305a as an example.

S305b. When failing to access a network through the optimal Wi-Fi access point, the device performs an operation of establishing a connection to the first Wi-Fi access point.

To improve user experience, if the device fails to connect to the optimal Wi-Fi access point, or if the device cannot access a network through the optimal Wi-Fi access point, the device restores the connection to the first Wi-Fi access point.

In this embodiment of the present invention, each time determining that a trigger event of switching a Wi-Fi access point occurs, a device immediately searches for an optimal Wi-Fi access point, and after determining an optimal Wi-Fi access point that needs to be selected, the device automatically disconnects from a currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 5:
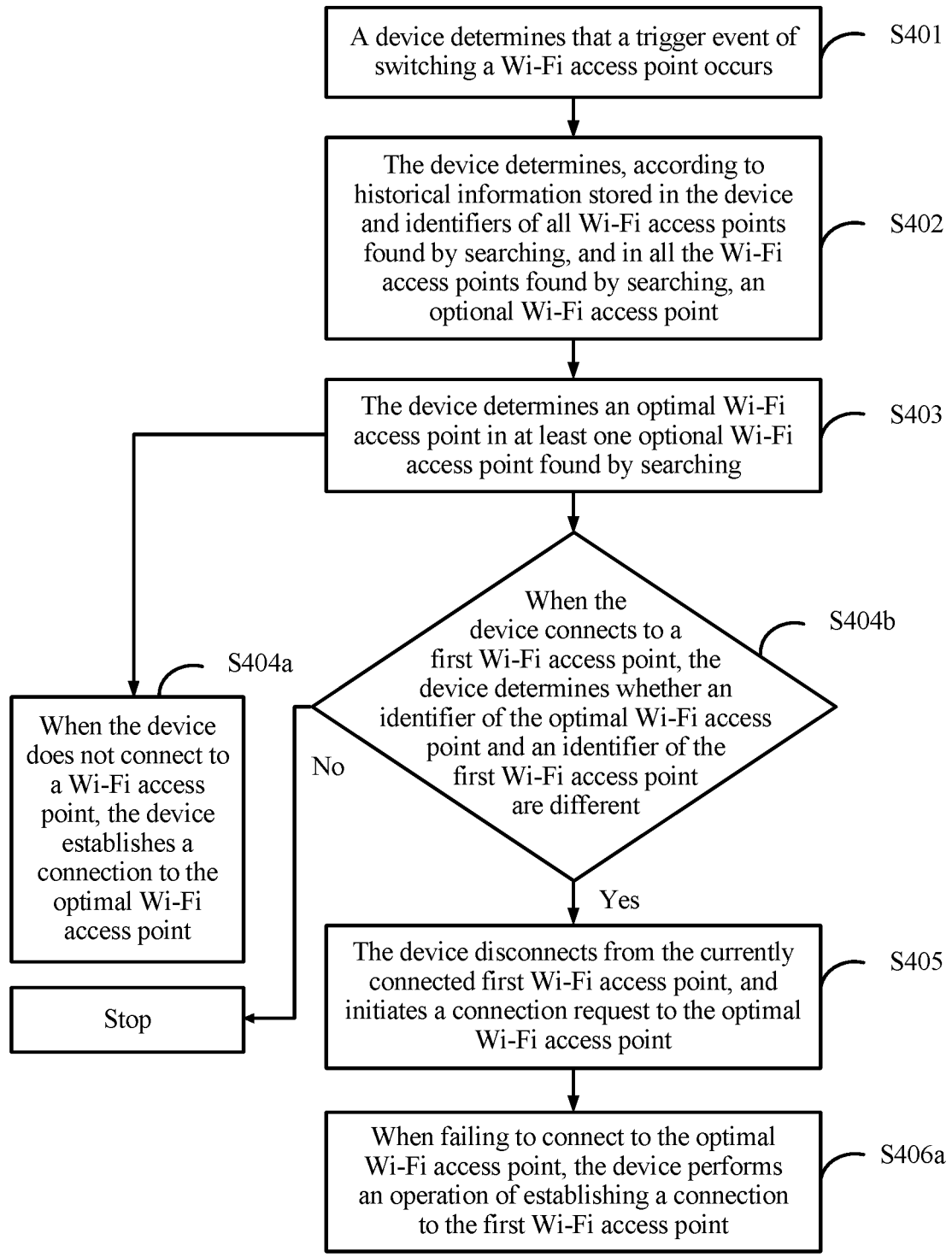
FIG. 5 is a schematic flowchart of Embodiment 4 of a communication connection control method according to the present invention.

FIG. 5 is a schematic flowchart of Embodiment 4 of a communication connection control method according to the present invention. As shown in FIG. 5, this embodiment gives a further description on the basis of the embodiment shown in FIG. 1 or FIG. 3, and specifically includes the following steps.

S401. The device determines that the trigger event of switching a Wi-Fi access point occurs.

S402. The device determines the optional Wi-Fi access point according to historical information stored in the device and identifiers of all Wi-Fi access points found by searching, and in all the Wi-Fi access points found by searching.

The historical information includes at least an identifier of at least one second Wi-Fi access point. The second Wi-Fi access point is a Wi-Fi access point to which the device successfully connects. In this embodiment, each time the device successfully connects to a specific Wi-Fi access point, the device records an identifier of the Wi-Fi access point, and specifically, the device records the identifier of the Wi-Fi access point in the foregoing historical information. In this case, in S402, the device determines, according to the historical information stored in the device, and in all the Wi-Fi access points found by searching, that at least one Wi-Fi access point, whose identifier exists in the historical information, is the at least one optional Wi-Fi access point. In comparison with the foregoing embodiment shown in FIG. 4, it may be learned that in this embodiment, the optional Wi-Fi access point is determined according to the historical information and in all the Wi-Fi access points found by searching. However, in the embodiment shown in FIG. 4, all the Wi-Fi access points found by searching are used as optional Wi-Fi access points (the first Wi-Fi access point may be screened out or may not be screened out).

In addition, the foregoing historical information further includes a password of a successfully connected Wi-Fi access point (if the Wi-Fi access point is a public Wi-Fi access point, there is no need to record a password), protocol information, signal strength, network bandwidth, a network speed, a location, a priority that is set by the user for the Wi-Fi access point, and the like.

It should be noted that the device connects to the first Wi-Fi access point at a current moment, and the "first" is used to particularly indicate a Wi-Fi access point to which the device connects at the current moment. After the device successfully connects to the first Wi-Fi access point, the device records at least an identifier of the first Wi-Fi access point in the historical information, and in this case, from a perspective of the historical information, the first Wi-Fi access point is a second Wi-Fi access point, whose identifier is recorded by the device in the historical information.

In addition, in this embodiment, the identifier of the optional Wi-Fi access point exists in the historical information of the device, and it indicates that before the current moment, the device has successfully connected to the optional Wi-Fi access point, or it may be considered that the determined at least one optional Wi-Fi access point has been authenticated by the device, and security of the at least one optional Wi-Fi access point is ensured, and the device is prevented from switching to a Wi-Fi access point with a potential security risk.

Because the device can automatically and periodically search around for a signal of a Wi-Fi access point, the foregoing all Wi-Fi access points found by searching may have been found by searching before S401, but possibly, the device is triggered by the trigger event of switching a Wi-Fi access point to search for a Wi-Fi access point, that is, before S402, the device further needs to perform the step of searching for a Wi-Fi access point.

S403. The device determines the optimal Wi-Fi access point in the at least one optional Wi-Fi access point found by searching.

Optionally, in this embodiment, with reference to the foregoing historical information, a preset method, that is, a priority selection method is provided. Specifically, after successfully connecting to any Wi-Fi access point, the device may set a priority for the successfully connected Wi-Fi access point, and therefore, the historical information further includes a priority corresponding to the identifier of each second Wi-Fi access point, and the device queries the historical information according to an identifier of each optional Wi-Fi access point to obtain a priority corresponding to the identifier of each optional Wi-Fi access point; and the device selects, in the at least one optional Wi-Fi access point, an optional Wi-Fi access point, whose identifier is corresponding to a highest priority, as the optimal Wi-Fi access point, or the historical information further includes a time corresponding to the identifier of each second Wi-Fi access point, where the time is a time at which the device successfully connects to the second Wi-Fi access point, and therefore, when the preset method is a time selection method, the device queries the historical information according to an identifier of each optional Wi-Fi access point to obtain a time corresponding to the identifier of each optional Wi-Fi access point, and the device selects, in the at least one optional Wi-Fi access point, an optional Wi-Fi access point, whose identifier is corresponding to a time point that is closest to the current moment, as the optimal Wi-Fi access point.

S404a. When the device does not connect to a Wi-Fi access point, the device establishes a connection to the optimal Wi-Fi access point.

It should be additionally noted that when the device does not connect to a Wi-Fi access point, before S402, when the device performs the step of searching for a Wi-Fi access point, the device may not find any Wi-Fi access point by searching, and in this case, the process stops, that is, steps subsequent to S402 are not performed; or when all Wi-Fi access points found by searching are Wi-Fi access points to which the device has not connected, for sake of security, a quantity of optional Wi-Fi access points determined in S402 is zero, and in this case, the process stops, that is, steps subsequent to S402 are not performed.

S404b. When the device connects to the first Wi-Fi access point, the device determines whether the identifier of the optimal Wi-Fi access point and the identifier of the first Wi-Fi access point are different. If yes, perform S405; or if no, the process stops.

It should be additionally noted that, possibly, before S402, the device may find at least the signal of the first Wi-Fi access point by searching, that is, there is certainly at least one Wi-Fi access point, and when the optional Wi-Fi access point is determined, the first Wi-Fi access point is not screened out. That is, the device also uses the currently connected Wi-Fi access point as an optional Wi-Fi access point, so as to determine an optimal Wi-Fi access point, and therefore, possibly, the determined optimal Wi-Fi access point is the currently connected first Wi-Fi access point, and therefore, the device maintains the connection to the first Wi-Fi access point, that is, the process stops; or when the optimal Wi-Fi access point is not the first Wi-Fi access point, that is, another Wi-Fi access point to which the device does not connect provides communication service quality better than that provided by the first Wi-Fi access point, and switching needs to be performed.

In this embodiment, FIG. 5 uses S404b as an example, and optionally, S404b may be replaced with the following S404c.

S404c. When the device connects to the first Wi-Fi access point, the device determines, according to the quality parameter of the optimal Wi-Fi access point and the quality parameter of the first Wi-Fi access point, whether the communication service quality provided by the optimal Wi-Fi access point is better than the communication service quality provided by the first Wi-Fi access point. If yes, perform S405; or if no, the process stops.

Possibly, before S402, the device may find at least the signal of the first Wi-Fi access point by searching, that is, there is certainly at least one Wi-Fi access point, and when the optional Wi-Fi access point is determined, the first Wi-Fi access point is screened out. That is, the foregoing optional Wi-Fi access point does not include the first Wi-Fi access point, and therefore possibly, a quantity of the optional Wi-Fi access point determined in S302 is zero, and in this case, this step stops, that is, the steps subsequent to S402 are not performed.

However, even if the first Wi-Fi access point is not considered, the device also determines the optional Wi-Fi access point, and in this case, communication service quality provided by the optimal Wi-Fi access point that is determined in the optional Wi-Fi access points that do not include the first Wi-Fi access point may not be better than that provided by the first Wi-Fi access point. When the communication service quality provided by the optimal Wi-Fi access point is not better than the communication service quality provided by the first Wi-Fi access point, switching does not need to be performed, that is, the process stops; or when the communication service quality provided by the first Wi-Fi access point is poorer than the communication service quality provided by the optimal Wi-Fi access point, switching is performed.

S405. The device disconnects from the currently connected first Wi-Fi access point, and initiates a connection request to the optimal Wi-Fi access point.

When the connection request is initiated to the optimal Wi-Fi access point, if the optimal Wi-Fi access point is a public Wi-Fi access point, the device may directly connect to the Wi-Fi access point; or if the optimal Wi-Fi access point is not a public Wi-Fi access point, in which a password is set, and in this embodiment, all optional Wi-Fi access points are Wi-Fi access points to which the device has successfully connected, the device connects to the optimal Wi-Fi access point by using the stored password.

S406a. When failing to connect to the optimal Wi-Fi access point, the device performs an operation of establishing a connection to the first Wi-Fi access point.

Possibly, the foregoing S406a may be replaced with the following S406b. FIG. 5 uses S406a as an example.

S406b. When failing to access a network through the optimal Wi-Fi access point, the device performs an operation of establishing a connection to the first Wi-Fi access point.

In this embodiment of the present invention, each time determining that a trigger event of switching a Wi-Fi access point occurs, a device immediately searches for an optimal Wi-Fi access point, and after determining an optimal Wi-Fi access point that needs to be selected, the device automatically disconnects from a currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 6:
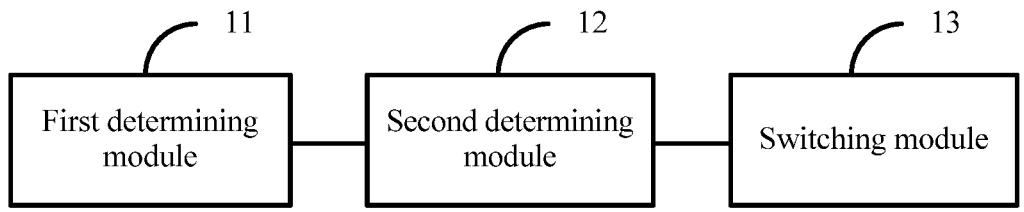
FIG. 6 is a schematic structural diagram of Embodiment 1 of a device according to the present invention.

FIG. 6 is a schematic structural diagram of Embodiment 1 of a device according to the present invention. As shown in FIG. 6, the device in this embodiment has a Wireless Fidelity Wi-Fi function, and includes a first determining module 11, configured to determine an optimal Wi-Fi access point in at least one optional Wireless Fidelity Wi-Fi access point found by searching, a second determining module 12, configured to determine, according to information about the optimal Wi-Fi access point and information about a currently connected first Wi-Fi access point, that the optimal Wi-Fi access point meets a switch condition, and a switching module 13, configured to disconnect from the first Wi-Fi access point, and initiate a connection request to the optimal Wi-Fi access point.

In this embodiment of the present invention, when a device finds that communication service quality provided by an optimal Wi-Fi access point is better than communication service quality provided by a currently connected Wi-Fi access point, the device automatically disconnects from the currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 7:
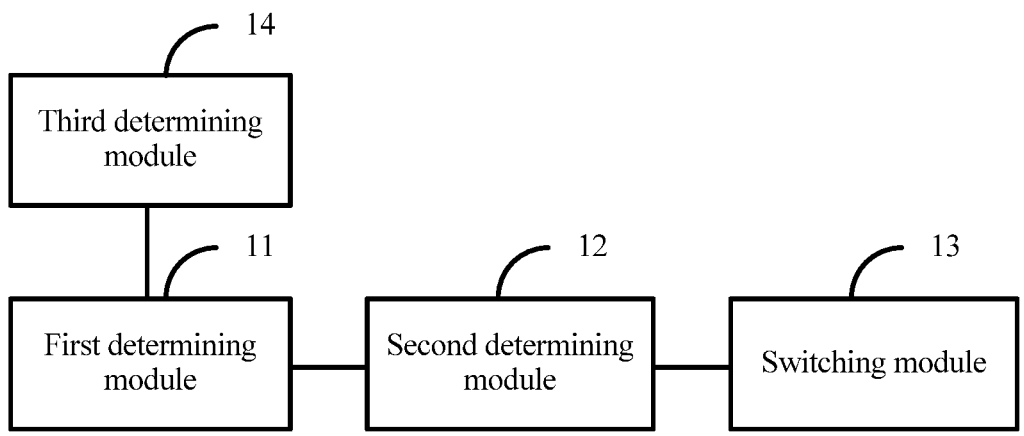
FIG. 7 is a schematic structural diagram of Embodiment 2 of a device according to the present invention.

FIG. 7 is a schematic structural diagram of Embodiment 2 of a device according to the present invention. As shown in FIG. 7, this embodiment gives a further description on the basis of the embodiment shown in FIG. 6. Specifically, the device further includes a third determining module 14, which is configured to determine that a trigger event of switching a Wi-Fi access point occurs.

The trigger event of switching a Wi-Fi access point includes at least any event or any combination of at least two events in the following events, including the device detects that signal strength of the first Wi-Fi access point decreases, the device learns that a location of the device changes, or the device detects that accessing a network through the first Wi-Fi access point fails or an access speed decreases.

Optionally, when the information is an identifier, the second determining module is specifically configured to determine that an identifier of the optimal Wi-Fi access point and an identifier of the currently connected first Wi-Fi access point are different, or when the information is a quality parameter, the second determining module is specifically configured to determine, according to a quality parameter of the optimal Wi-Fi access point and a quality parameter of the first Wi-Fi access point, that communication service quality provided by the optimal Wi-Fi access point is better than communication service quality provided by the first Wi-Fi access point.

The quality parameter is at least one of the following parameters, including a priority of the Wi-Fi access point, signal strength of the Wi-Fi access point, network bandwidth of the Wi-Fi access point, an access speed of the Wi-Fi access point, or a distance between a location of the Wi-Fi access point and the device.

Further, the first determining module 11 is further configured to determine, according to historical information stored in the memory, and in all Wi-Fi access points found by searching, that at least one Wi-Fi access point, whose identifier exists in the historical information, is the at least one optional Wi-Fi access point.

The historical information includes at least an identifier of at least one second Wi-Fi access point. The second Wi-Fi access point is a Wi-Fi access point to which the device successfully connects.

Optionally, the first determining module 11 is specifically configured to determine, according to signal strength of each optional Wi-Fi access point, that a Wi-Fi access point having highest signal strength is the optimal Wi-Fi access point.

Optionally, the first determining module 11 is specifically configured to select, according to a location of each optional Wi-Fi access point and the location of the device, a Wi-Fi access point closest to the device as the optimal Wi-Fi access point.

A location of any Wi-Fi access point found by searching by the device is obtained by the device from the Wi-Fi access point or a remote server.

Optionally, the first determining module 11 is specifically configured to select, according to network bandwidth of each optional Wi-Fi access point and in the at least one optional Wi-Fi access point found by searching, a Wi-Fi access point having largest network bandwidth as the optimal Wi-Fi access point.

Network bandwidth of any Wi-Fi access point found by searching by the device is sent by the Wi-Fi access point to the device, or is learned by the device by means of detection on the Wi-Fi access point.

Further, the first determining module 11 is specifically configured to determine, according to an access speed of each optional Wi-Fi access point, that an optional Wi-Fi access point having a highest access speed is the optimal Wi-Fi access point.

An access speed of any Wi-Fi access point found by searching by the device is sent by the Wi-Fi access point to the device, or is learned by the device by means of detection on the Wi-Fi access point.

Optionally, if the historical information further includes a time corresponding to the identifier of each second Wi-Fi access point. The time is a time at which the device successfully connects to the second Wi-Fi access point, the first determining module 11 is specifically configured to query the historical information according to an identifier of each optional Wi-Fi access point to obtain a time corresponding to the identifier of each optional Wi-Fi access point.

The device selects, in the at least one optional Wi-Fi access point, an optional Wi-Fi access point, whose identifier is corresponding to a time point that is closest to the current moment, as the optimal Wi-Fi access point.

Optionally, if the historical information further includes a priority corresponding to the identifier of each second Wi-Fi access point, the first determining module 11 is specifically configured to query the historical information according to an identifier of each optional Wi-Fi access point to obtain a priority corresponding to the identifier of each optional Wi-Fi access point.

The first determining module 11 is specifically configured to select, in the at least one optional Wi-Fi access point, an optional Wi-Fi access point, whose identifier is corresponding to a highest priority, as the optimal Wi-Fi access point.

Further, the switching module 13 is further configured to: when the device fails to connect to the optimal Wi-Fi access point, perform an operation of establishing a connection to the first Wi-Fi access point; or the switching module 13 is further configured to: when the device fails to access a network through the optimal Wi-Fi access point, perform an operation of establishing a connection to the first Wi-Fi access point.

In this embodiment of the present invention, each time determining that a trigger event of switching a Wi-Fi access point occurs, a device immediately searches for an optimal Wi-Fi access point, and after determining an optimal Wi-Fi access point that needs to be selected, the device automatically disconnects from a currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 8:
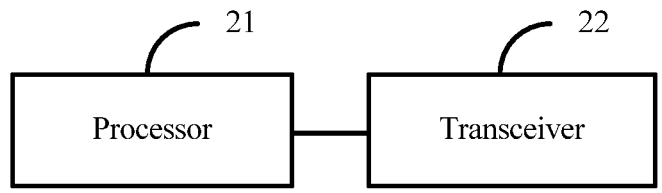
FIG. 8 is a schematic structural diagram of Embodiment 3 of a device according to the present invention.

FIG. 8 is a schematic structural diagram of Embodiment 3 of a device according to the present invention. As shown in FIG. 8, in this embodiment, the device has a Wireless Fidelity Wi-Fi function, and includes a processor 21 and a transceiver 22.

The processor 21 is configured to determine an optimal Wi-Fi access point in at least one optional Wireless Fidelity Wi-Fi access point found by searching.

The processor 21 is configured to determine, according to information about the optimal Wi-Fi access point and information about a currently connected first Wi-Fi access point, that the optimal Wi-Fi access point meets a switch condition.

The transceiver 22 is configured to disconnect from the first Wi-Fi access point, and initiate a connection request to the optimal Wi-Fi access point.

In this embodiment of the present invention, when a device finds that communication service quality provided by an optimal Wi-Fi access point is better than communication service quality provided by a currently connected Wi-Fi access point, the device automatically disconnects from the currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 9:
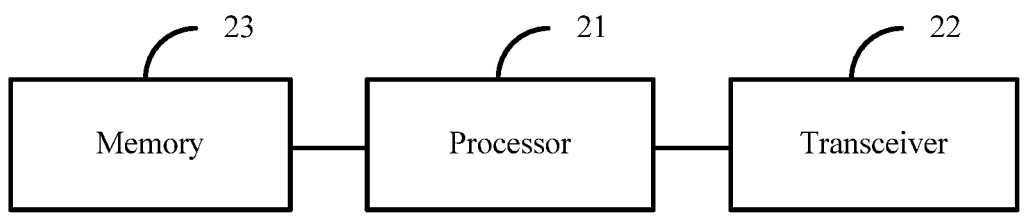
FIG. 9 is a schematic structural diagram of Embodiment 4 of a device according to the present invention.

FIG. 9 is a schematic structural diagram of Embodiment 4 of a device according to the present invention. As shown in FIG. 9, this embodiment gives a further description on the basis of the embodiment shown in FIG. 8, and the processor 21 is further configured to determine that a trigger event of switching a Wi-Fi access point occurs.

The trigger event of switching a Wi-Fi access point includes at least any event or any combination of at least two events in the following events, including the device detects that signal strength of the first Wi-Fi access point decreases, the device learns that a location of the device changes, or the device detects that accessing a network through the first Wi-Fi access point fails or an access speed decreases.

Optionally, when the information is an identifier, and the processor 21 is configured to determine, according to the information about the optimal Wi-Fi access point and the information about the currently connected first Wi-Fi access point, that the optimal Wi-Fi access point meets the switch condition, the processor 21 is specifically configured to determine that an identifier of the optimal Wi-Fi access point and an identifier of the currently connected first Wi-Fi access point are different, or when the information is a quality parameter, and the processor 21 is configured to determine, according to the information about the optimal Wi-Fi access point and the information about the currently connected first Wi-Fi access point, that the optimal Wi-Fi access point meets the switch condition, the processor 21 is specifically configured to determine, according to a quality parameter of the optimal Wi-Fi access point and a quality parameter of the first Wi-Fi access point, that communication service quality provided by the optimal Wi-Fi access point is better than communication service quality provided by the first Wi-Fi access point.

The quality parameter is at least one of the following parameters, including a priority of the Wi-Fi access point, signal strength of the Wi-Fi access point, network bandwidth of the Wi-Fi access point, an access speed of the Wi-Fi access point, or a distance between a location of the Wi-Fi access point and the device.

Further, the device further includes a memory 23, which is configured to store historical information.

The processor 21 is further configured to determine, according to historical information stored in the memory 23, and in all Wi-Fi access points found by searching, that at least one Wi-Fi access point, whose identifier exists in the historical information, is the at least one optional Wi-Fi access point.

The historical information includes at least an identifier of at least one second Wi-Fi access point. The second Wi-Fi access point is a Wi-Fi access point to which the device successfully connects.

Optionally, when the processor 21 is configured to determine, according to the information about the optimal Wi-Fi access point and the information about the currently connected first Wi-Fi access point, that the optimal Wi-Fi access point meets the switch condition, the processor 21 is specifically configured to determine, according to signal strength of each optional Wi-Fi access point, that a Wi-Fi access point having highest signal strength is the optimal Wi-Fi access point.

Optionally, when the processor 21 is configured to determine, according to the information about the optimal Wi-Fi access point and the information about the currently connected first Wi-Fi access point, that the optimal Wi-Fi access point meets the switch condition, the processor 21 is specifically configured to select, according to a location of each optional Wi-Fi access point and the location of the device, a Wi-Fi access point closest to the device as the optimal Wi-Fi access point.

A location of any Wi-Fi access point found by searching by the device is obtained from the Wi-Fi access point or a remote server by the transceiver 22 triggered by the processor 21.

Optionally, when the processor 21 is configured to determine, according to the information about the optimal Wi-Fi access point and the information about the currently connected first Wi-Fi access point, that the optimal Wi-Fi access point meets the switch condition, the processor 21 is specifically configured to select, according to network bandwidth of each optional Wi-Fi access point and in the at least one optional Wi-Fi access point found by searching, a Wi-Fi access point having largest network bandwidth as the optimal Wi-Fi access point.

Network bandwidth of any Wi-Fi access point found by searching by the device is sent by the Wi-Fi access point to the device, or is learned by the device by means of detection on the Wi-Fi access point.

Optionally, when the processor 21 is configured to determine, according to the information about the optimal Wi-Fi access point and the information about the currently connected first Wi-Fi access point, that the optimal Wi-Fi access point meets the switch condition, the processor 21 is specifically configured to determine, according to an access speed of each optional Wi-Fi access point, that an optional Wi-Fi access point having a highest access speed is the optimal Wi-Fi access point.

An access speed of any Wi-Fi access point found by searching by the device is sent by the Wi-Fi access point to the device, or is learned by the device by means of detection on the Wi-Fi access point.

Optionally, if the historical information further includes a time corresponding to the identifier of each second Wi-Fi access point. The time is a time at which the device successfully connects to the second Wi-Fi access point, when the processor 21 is configured to determine, according to the information about the optimal Wi-Fi access point and the information about the currently connected first Wi-Fi access point, that the optimal Wi-Fi access point meets the switch condition, the processor 21 is specifically configured to query the historical information according to an identifier of each optional Wi-Fi access point to obtain a time corresponding to the identifier of each optional Wi-Fi access point.

The device selects, in the at least one optional Wi-Fi access point, an optional Wi-Fi access point, whose identifier is corresponding to a time point that is closest to the current moment, as the optimal Wi-Fi access point.

Optionally, if the historical information further includes a priority corresponding to the identifier of each second Wi-Fi access point, when the processor 21 is configured to determine, according to the information about the optimal Wi-Fi access point and the information about the currently connected first Wi-Fi access point, that the optimal Wi-Fi access point meets the switch condition, the processor 21 is specifically configured to query the historical information according to an identifier of each optional Wi-Fi access point to obtain a priority corresponding to the identifier of each optional Wi-Fi access point.

The device selects, in the at least one optional Wi-Fi access point, an optional Wi-Fi access point, whose identifier is corresponding to a highest priority, as the optimal Wi-Fi access point.

Optionally, the transceiver 22 is further configured to: when the device fails to connect to the optimal Wi-Fi access point, perform an operation of establishing a connection to the first Wi-Fi access point; or optionally, the transceiver 22 is further configured to: when the device fails to access a network through the optimal Wi-Fi access point, perform an operation of establishing a connection to the first Wi-Fi access point.

In this embodiment of the present invention, each time determining that a trigger event of switching a Wi-Fi access point occurs, a device immediately searches for an optimal Wi-Fi access point, and after determining an optimal Wi-Fi access point that needs to be selected, the device automatically disconnects from a currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

Figure 10:
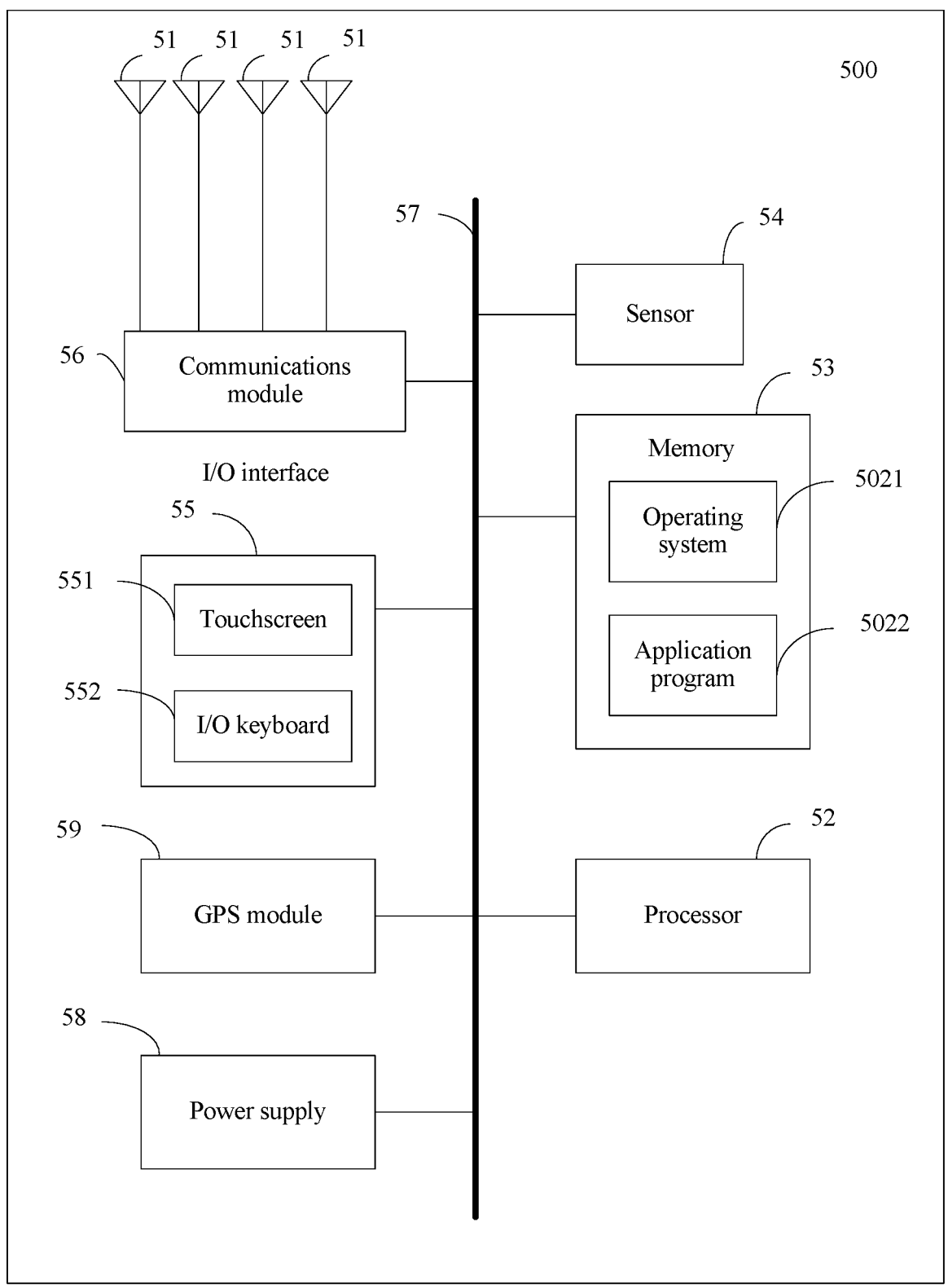
FIG. 10 is a schematic structural diagram of Embodiment 5 of a device according to the present invention.

FIG. 10 is a schematic structural diagram of Embodiment 5 of a device according to the present invention. As shown in FIG. 10, the device in this embodiment is merely an example, and it may be understood that, in actual application, the device may be a smartphone, an iPad, or the like. Internal modules and parts of different devices are different, and therefore in practice, the device may have more or fewer parts than those shown in FIG. 10, may combine two or more parts, or may have different part configurations. Various parts shown in FIG. 10 may be implemented in hardware that includes one or more signal processing and/or application-specific integrated circuits, in software, or in a combination of hardware and software.

A device 500 includes at least two antennas 51, at least one processor 52, a memory 53, a sensor 54, an I/O interface 55, a communications module 56, and at least one communications bus 57. Further, the device further includes other functional components, such as a power supply 58 supplying power to the device, and a GPS module 59; and the communications bus 57 is configured to implement connection and communication between modules and between components. The memory 53 may include a non-volatile solid-state memory and/or a dynamics non-volatile storage device, such as a flash memory and a rotatable disk drive. The sensor 54 includes multiple types of sensors, for example, displacement sensors such as an acceleration sensor and a direction sensor. The communications module 56 may be configured for long-distance communication, such as Global System for Mobile communication (GSM), Code Division Multiple Access (CDMA), General Packet Radio Service (GPRS), Enhanced Data Rate for GSM Evolution (EDG), 3G technologies such as Wideband Code Division Multiple Access (WCDMA), Time Division-Synchronous Code Division Multiple Access (TD-SCDMA), and a 4G technology such as Long Term Evolution (LTE), and the communications module 56 may also be configured for short-distance communication, and may perform short-distance wireless communication with a third-party device (for example, an intelligent wearable device) in a short distance, such as ZigBee, UWB, Wi-Fi, Bluetooth, NFC, and infrared communication. An antenna 51 cooperating with the communications module 56 is configured to receive and send a signal.

Specifically, the I/O interface 55 includes a touchscreen 551 used for display and input, an I/O keyboard 552 used for input (optional), and the like.

Specifically, the memory 53 includes an operating system 5021 and an application program 5022. The operating system 5021 includes various operating system programs and is configured to implement various hardware-based operations. The application program 5022 includes various application programs and is configured to implement various application functions, such as a control program for searching for a signal of a Wi-Fi access point, a program for identifying an identifier of a Wi-Fi access point, a program for identifying a trigger event, a program for determining an optimal Wi-Fi access point, and a control program for switching a Wi-Fi access point.

Further, the memory 53 may further store a switch condition, historical information, a priority of a Wi-Fi access point, and the like.

The processor 52 performs communication with the foregoing modules and components by using the communications bus 57, and performs the program for identifying a trigger event to identify a trigger event, and further performs the control program for searching for a signal of a Wi-Fi access point, so as to find at least one optional Wi-Fi access point by searching by using the communications module 56, and then the processor 52 performs the program for determining an optimal Wi-Fi access point, and determines an optimal Wi-Fi access point in the at least one optional Wi-Fi access point, and finally performs the control program for switching a Wi-Fi access point to determine that the optimal Wi-Fi access point meets the switch condition stored in the memory 53, and switches to the optimal Wi-Fi access point.

In addition, the processor 52 may further control the touchscreen 51 by using the communications bus 57, so as to display the optimal Wi-Fi access point for a user.

Optionally, when performing the program for identifying a trigger event, the processor 52 performs communication with the displacement sensors such as the acceleration senor and the direction sensor, or with the GSM to learn that a location of the device changes, so as to identify the change of the location of the device as a trigger event, and then performs the control program for searching for a signal of a Wi-Fi access point, and performs the program for determining an optimal Wi-Fi access point, the control program for switching a Wi-Fi access point, and the like.

Optionally, when performing the program for identifying a trigger event, the processor 52 performs communication with the communications module 56, and when detecting that accessing a network through the first Wi-Fi access point fails or an access speed decreases, or a signal of the first Wi-Fi access point weakens, the processor 52 identifies as a trigger event, and then performs the program for determining an optimal Wi-Fi access point, and then performs the control program for searching for a signal of a Wi-Fi access point, the program for determining an optimal Wi-Fi access point, the control program for switching a Wi-Fi access point, and the like.

Alternatively, possibly, when performing the control program for switching a Wi-Fi access point, the processor 52 determines, with reference to the program for identifying an identifier of a Wi-Fi access point and according to an identifier of the optimal Wi-Fi access point and an identifier of the first Wi-Fi access point, whether the optimal Wi-Fi access point meets the switch condition.

Possibly, when performing the control program for switching a Wi-Fi access point, the processor 52 determines, with reference to a quality parameter of the optimal Wi-Fi access point and a quality parameter of the first Wi-Fi access point that are obtained by the communications module 56, whether the optimal Wi-Fi access point meets the switch condition.

In this embodiment of the present invention, each time determining that a trigger event of switching a Wi-Fi access point occurs, a device immediately searches for an optimal Wi-Fi access point, and after determining an optimal Wi-Fi access point that needs to be selected, the device automatically disconnects from a currently connected Wi-Fi access point, and initiates a connection request to the optimal Wi-Fi access point to obtain better communication service quality in a timely manner. This avoids a waste of network resources, and improves an intelligentization characteristic of human computer interaction of the device because user intervention of manual switch is not required.

It should be noted that the devices shown in FIG. 6 and FIG. 10 may be implemented in another manner. Division of all modules, components, or units is merely logical function division and there may be another division manner in actual implementation. For example, multiple modules or units may be combined or further be divided into multiple modules or units, or some features may be ignored. In addition, there are communication connections between modules and between units, and specifically, the communication connections may be implemented by using some interfaces and in indirect coupling or direct coupling manner, and the communication connections may be implemented in electrical, mechanical, or another form.

In addition, modules in each device embodiment may be integrated into one functional module, or each of the modules may exist alone physically, and each module may be implemented in a hardware and/or software form.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication connection control method, comprising:
   determining, by a device having a Wireless Fidelity (Wi-Fi) function, and in response to a trigger event of switching a Wi-Fi access point occurring, an optimal Wi-Fi access point in at least one optional Wi-Fi access point found by searching, wherein the trigger event comprises at least one of the device determining that a location of the device changes, the device detecting that accessing a network through a currently connected first Wi-Fi access point fails, or the device detecting that an access speed decreases;
   determining, by the device, according to information about the optimal Wi-Fi access point and information about the first Wi-Fi access point, that the optimal Wi-Fi access point meets a switch condition different from the trigger event, wherein the switch condition comprises an identifier of the optimal Wi-Fi access point and an identifier of the currently connected first Wi-Fi access point being different;
   disconnecting, by the device, from the first Wi-Fi access point in response to the optimal Wi-Fi access point meeting the switch condition and further in response to the trigger event occurring, and initiating a connection request to the optimal Wi-Fi access point; and
   restoring a connection to the first Wi-Fi access point, after the disconnecting from the first Wi-Fi access point, and in response to at least one of the device failing to connect to the optimal Wi-Fi access point or the device failing to access a network through the optimal Wi-Fi access point.

2. The control method according to claim 1, further comprising performing, before the determining, by the device, an optimal Wi-Fi access point in at least one optional Wi-Fi access point found by searching:
   determining, by the device, that the trigger event of switching a Wi-Fi access point occurs.

3. The control method according to claim 1, wherein the determining, by the device according to information about the optimal Wi-Fi access point and information about a currently connected first Wi-Fi access point, that the optimal Wi-Fi access point meets a switch condition further comprises:
   determining, by the device, when the information is a quality parameter, and according to a quality parameter of the optimal Wi-Fi access point and a quality parameter of the first Wi-Fi access point, that communication service quality provided by the optimal Wi-Fi access point is better than communication service quality provided by the first Wi-Fi access point, wherein the quality parameter is at least one of a priority of the Wi-Fi access point, signal strength of the Wi-Fi access point, network bandwidth of the Wi-Fi access point, an access speed of the Wi-Fi access point, or a distance between a location of the Wi-Fi access point and the device.

4. The control method according to claim 1, further comprising performing, before the determining, by the device, the optimal Wi-Fi access point in the at least one optional Wi-Fi access point found by searching:
determining, by the device according to historical information stored in the device, and in all Wi-Fi access points found by searching, that at least one Wi-Fi access point, whose identifier exists in the historical information, is the at least one optional Wi-Fi access point, wherein the historical information comprises at least an identifier of second Wi-Fi access point, and wherein the second Wi-Fi access point is a Wi-Fi access point to which the device successfully connects.

5. The control method according to claim 4, wherein the historical information further comprises a time corresponding to each second Wi-Fi access point identifier, wherein the time is a time at which the device successfully connects to the second Wi-Fi access point; and
wherein the determining, by the device, an optimal Wi-Fi access point in at least one optional Wi-Fi access point found by searching comprises:
querying, by the device, the historical information according to an identifier of each optional Wi-Fi access point to obtain a time corresponding to the identifier of each optional Wi-Fi access point; and
selecting, by the device in the at least one optional Wi-Fi access point, an optional Wi-Fi access point, whose identifier is corresponding to a time point that is closest to a current moment, as the optimal Wi-Fi access point.

6. The control method according to claim 1, wherein the determining, by the device, an optimal Wi-Fi access point in at least one optional Wi-Fi access point found by searching comprises:
determining, by the device according to signal strength of each optional Wi-Fi access point, that a Wi-Fi access point having highest signal strength is the optimal Wi-Fi access point.

7. The control method according to claim 1, wherein the determining, by the device, an optimal Wi-Fi access point in at least one optional Wi-Fi access point found by searching comprises:
selecting, by the device according to a location of each optional Wi-Fi access point and the location of the device, a Wi-Fi access point closest to the device as the optimal Wi-Fi access point, wherein a location of any Wi-Fi access point found by searching by the device is obtained by the device from the Wi-Fi access point or a remote server.

8. The control method according to claim 1, wherein the determining, by the device, the optimal Wi-Fi access point in at least one optional Wi-Fi access point found by searching comprises:
selecting, by the device according to network bandwidth of each optional Wi-Fi access point and in the at least one optional Wi-Fi access point found by searching, a Wi-Fi access point having largest network bandwidth as the optimal Wi-Fi access point, wherein network bandwidth of any Wi-Fi access point found by searching by the device is sent by the Wi-Fi access point to the device, or is learned by the device by detection on the Wi-Fi access point.

9. The control method according to claim 1, wherein the determining, by the device, the optimal Wi-Fi access point in at least one optional Wi-Fi access point found by searching comprises:
determining, by the device according to an access speed of each optional Wi-Fi access point, that an optional Wi-Fi access point having a highest access speed is the optimal Wi-Fi access point, wherein an access speed of any Wi-Fi access point found by searching by the device is at least one of sent by the Wi-Fi access point to the device, or is learned by the device by detection on the Wi-Fi access point.

10. A device having a Wireless Fidelity (Wi-Fi) function, the device comprising:
a transceiver;
a processor; and
a non-transitory computer-readable storage medium storing a program to be executed by the processor, the program including instructions to:
determine, in response to a trigger event of switching a Wi-Fi access point occurring, an optimal Wi-Fi access point in at least one optional Wi-Fi access point found by searching, wherein the trigger event comprises at least one of the device determining that a location of the device changes, the device detecting that accessing a network through a currently connected first Wi-Fi access point fails, or the device detecting that an access speed decreases;
determine, according to information about the optimal Wi-Fi access point and information about the first Wi-Fi access point, that the optimal Wi-Fi access point meets a switch condition different from the trigger event, wherein the switch condition comprises an identifier of the optimal Wi-Fi access point and an identifier of the currently connected first Wi-Fi access point being different;
cause, in response to the optimal Wi-Fi access point meeting the switch condition and further in response to the trigger event occurring, the transceiver to disconnect from the first Wi-Fi access point, and initiate a connection request to the optimal Wi-Fi access point; and
restore a connection to the first Wi-Fi access point after causing the transceiver to disconnect from the first Wi-Fi access point, and in response to at least one of the device failing to connect to the optimal Wi-Fi access point or the device failing to access a network through the optimal Wi-Fi access point.

11. The device according to claim 10, wherein the program further includes instructions to determine that the trigger event of switching the Wi-Fi access point occurs.

12. The device according to claim 10, wherein when the information is an identifier, and wherein the program further includes instructions to:
determine, according to the information about the optimal Wi-Fi access point and the information about the currently connected first Wi-Fi access point, that the optimal Wi-Fi access point meets the switch condition; and
perform at least one of:

determine that an identifier of the optimal Wi-Fi access point and an identifier of the currently connected first Wi-Fi access point are different; or wherein the switch condition further comprises determining, determine, according to a quality parameter of the optimal Wi-Fi access point and a quality parameter of the first Wi-Fi access point, and when the information is a quality parameter, that communication service quality provided by the optimal Wi-Fi access point is better than communication service quality provided by the first Wi-Fi access point, wherein the quality parameter is at least one of a priority of the Wi-Fi access point, signal strength of the Wi-Fi access point, network bandwidth of the Wi-Fi access point, an access speed of the Wi-Fi access point, or a distance between a location of the Wi-Fi access point and the device.

13. The device according to claim 10, further comprising a memory, configured to store historical information;

wherein the program further includes instructions to determine, according to historical information stored in the memory, and in all Wi-Fi access points found by searching, that at least one Wi-Fi access point, whose identifier exists in the historical information, is the at least one optional Wi-Fi access point, wherein the historical information comprises at least an identifier of second Wi-Fi access point, and wherein the second Wi-Fi access point is a Wi-Fi access point to which the device successfully connects.

14. The device according to claim 10, wherein when the program further includes instructions to determine, according to the information about the optimal Wi-Fi access point and the information about the currently connected first Wi-Fi access point, that the optimal Wi-Fi access point meets the switch condition, the processor is specifically configured to determine, according to signal strength of each optional Wi-Fi access point, that a Wi-Fi access point having highest signal strength is the optimal Wi-Fi access point.

15. The device according to claim 10, wherein the program further includes instructions to:

determine, according to the information about the optimal Wi-Fi access point and the information about the currently connected first Wi-Fi access point, that the optimal Wi-Fi access point meets the switch condition; and select, according to a location of each optional Wi-Fi access point and the location of the device, a Wi-Fi access point closest to the device as the optimal Wi-Fi access point, wherein a location of any Wi-Fi access point found by searching by the device is obtained from one of the Wi-Fi access point or a remote server by the transceiver triggered by the processor.

16. The device according to claim 10, wherein the program further includes instructions to:

determine, according to the information about the optimal Wi-Fi access point and the information about the currently connected first Wi-Fi access point, that the optimal Wi-Fi access point meets the switch condition; and select, according to network bandwidth of each optional Wi-Fi access point and in the at least one optional Wi-Fi access point found by searching, a Wi-Fi access point having largest network bandwidth as the optimal Wi-Fi access point, wherein network bandwidth of any Wi-Fi access point found by searching by the device is sent by the Wi-Fi access point to the device, or is learned by the device by detection on the Wi-Fi access point.

17. The device according to claim 10, wherein program further includes instructions to:

determine, according to the information about the optimal Wi-Fi access point and the information about the currently connected first Wi-Fi access point, that the optimal Wi-Fi access point meets the switch condition, the processor is specifically configured to determine, according to an access speed of each optional Wi-Fi access point, that an optional Wi-Fi access point having a highest access speed is the optimal Wi-Fi access point, wherein an access speed of any Wi-Fi access point found by searching by the device is sent by the Wi-Fi access point to the device, or is learned by the device by detection on the Wi-Fi access point.

18. The device according to claim 13, wherein the historical information further comprises a time corresponding to the identifier of each second Wi-Fi access point, wherein the time is a time at which the device successfully connects to the second Wi-Fi access point; and wherein the program further includes instructions to:

determine, according to the information about the optimal Wi-Fi access point and the information about the currently connected first Wi-Fi access point, that the optimal Wi-Fi access point meets the switch condition;

query the historical information according to an identifier of each optional Wi-Fi access point to obtain a time corresponding to the identifier of each optional Wi-Fi access point; and select, in the at least one optional Wi-Fi access point, an optional Wi-Fi access point, whose identifier is corresponding to a time point that is closest to a current moment, as the optimal Wi-Fi access point.

19. The device according to claim 13, wherein the historical information further comprises a priority corresponding to the identifier of each second Wi-Fi access point; and wherein the program further includes instructions to:

determine, according to the information about the optimal Wi-Fi access point and the information about the currently connected first Wi-Fi access point, that the optimal Wi-Fi access point meets the switch condition;

query the historical information according to an identifier of each optional Wi-Fi access point to obtain a priority corresponding to the identifier of each optional Wi-Fi access point; and select, in the at least one optional Wi-Fi access point, an optional Wi-Fi access point, whose identifier is corresponding to a highest priority, as the optimal Wi-Fi access point.

20. A device having a Wireless Fidelity (Wi-Fi) function, the device comprising:

a transceiver;

a processor; and a non-transitory computer-readable storage medium storing a program to be executed by the processor, the program including instructions to:

determine that a trigger event of switching a Wi-Fi access point occurs, wherein the trigger event of switching a Wi-Fi access point comprises that the device has connected to a first Wi-Fi access point but fails to access a network via the first Wi-Fi access point;

determine, in response to the trigger event of switching a Wi-Fi access point occurring, an optimal Wi-Fi access point in at least one optional Wi-Fi access point found by searching;

determine, according to information about the optimal Wi-Fi access point and information about a currently connected first Wi-Fi access point, that the optimal Wi-Fi access point meets a switch condition different from the trigger event, wherein the switch condition comprises an identifier of the optimal Wi-Fi access point and an identifier of the currently connected first Wi-Fi access point being different;

cause the transceiver to disconnect from the first Wi-Fi access point, and initiate a connection request to the optimal Wi-Fi access point in response to determining that the trigger event occurs, and further in response to the optimal Wi-Fi access point meeting the switch condition; and cause the transceiver to restore a connection to the first Wi-Fi access point, after the causing the transceiver to disconnect from the first Wi-Fi access point, and in response to at least one of the device failing to connect to the optimal Wi-Fi access point or the device failing to access a network through the optimal Wi-Fi access point.

* * * * *